(12) United States Patent  
Szczerba

(10) Patent No.: US 8,482,430 B2  
(45) Date of Patent: Jul. 9, 2013

(54) METHOD AND APPARATUS FOR COMMUNICATIVELY CHANGING INTERIOR ILLUMINATION COLOR IN A VEHICLE

(75) Inventor: Joseph F. Szczerba, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 891 days.

(21) Appl. No.: 12/578,103

(22) Filed: Oct. 13, 2009

(65) Prior Publication Data

US 2011/0084852 A1 Apr. 14, 2011

(51) Int. Cl.  
*G08G 1/16* (2006.01)

(52) U.S. Cl.  
USPC ........ 340/903; 340/435; 340/459; 340/815.4; 340/815.65; 340/905; 362/464; 362/488

(58) Field of Classification Search  
USPC ................. 340/438, 459, 435, 901, 903, 905, 340/815.4, 815.45, 815.65; 362/276, 464–466, 362/487–492, 494, 501, 503, 504  
See application file for complete search history.

(56) References Cited

U.S. PATENT DOCUMENTS

| | | | |
|---|---|---|---|
| 5,469,184 A * | 11/1995 | Mount | 340/441 |
| 6,536,928 B1 | 3/2003 | Hein et al. | |
| 6,914,521 B2 * | 7/2005 | Rothkop | 340/435 |
| 6,935,763 B2 | 8/2005 | Mueller et al. | |
| 7,344,277 B2 * | 3/2008 | Anderson et al. | 340/815.4 |
| 2002/0158583 A1 * | 10/2002 | Lys et al. | 315/82 |
| 2004/0070964 A1 * | 4/2004 | Lo | 362/489 |
| 2004/0085746 A1 * | 5/2004 | Chen | 362/489 |
| 2005/0063194 A1 | 3/2005 | Lys et al. | |
| 2005/0185399 A1 | 8/2005 | Beerman et al. | |
| 2006/0070795 A1 * | 4/2006 | Meissner | 180/446 |
| 2006/0271261 A1 * | 11/2006 | Flores et al. | 701/49 |
| 2007/0047246 A1 * | 3/2007 | Barowski et al. | 362/488 |
| 2007/0109785 A1 | 5/2007 | Wittorf et al. | |
| 2008/0219017 A1 * | 9/2008 | Cruickshank | 362/488 |

\* cited by examiner

*Primary Examiner* — Thomas Mullen

(57) ABSTRACT

An apparatus for communicating information to an operator of a vehicle without unnecessarily distracting the operator by illuminating an interior of the vehicle with different colors, includes an illumination control module monitoring an informational input and determining a lighting color command based upon the informational input. The apparatus further includes an illumination system communicating with the illumination control module and generating an illumination color upon the interior based upon the lighting color command.

24 Claims, 3 Drawing Sheets

METHOD AND APPARATUS FOR COMMUNICATIVELY CHANGING INTERIOR ILLUMINATION COLOR IN A VEHICLE

TECHNICAL FIELD

This disclosure is related to communicatively changing interior illumination color in a vehicle to communicate conditions and information to the driver.

BACKGROUND

The statements in this section merely provide background information related to the present disclosure and may not constitute prior art.

Information such as weather, temperature, traffic conditions, arrival time and deviations, stock prices, sports scores, music being played, GPS, cell phone connections, etc. are often sought by the driver and passengers within a vehicle. Too much information regarding multiple systems can be distracting to a driver trying to operate the vehicle as well as difficult to locate quickly and effortlessly.

It is known, for example, to have all the information displayed and controlled from a central unit on the dashboard of a vehicle. However, this information is often a complete description of the information and often more detailed than desired. Also, the operator controlling the central unit may have to jog through several displays to reach the information sought for. Such traditional means may become distracting when only a summary of the information is required.

SUMMARY

An apparatus for communicating information to an operator of a vehicle without unnecessarily distracting the operator by illuminating an interior of the vehicle with different colors, includes an illumination control module monitoring an informational input and determining a lighting color command based upon the informational input. The apparatus further includes an illumination system communicating with the illumination control module and generating an illumination color upon the interior based upon the lighting color command.

BRIEF DESCRIPTION OF THE DRAWINGS

One or more embodiments will now be described, by way of example, with reference to the accompanying drawings, in which.

DETAILED DESCRIPTION

Figure 1:
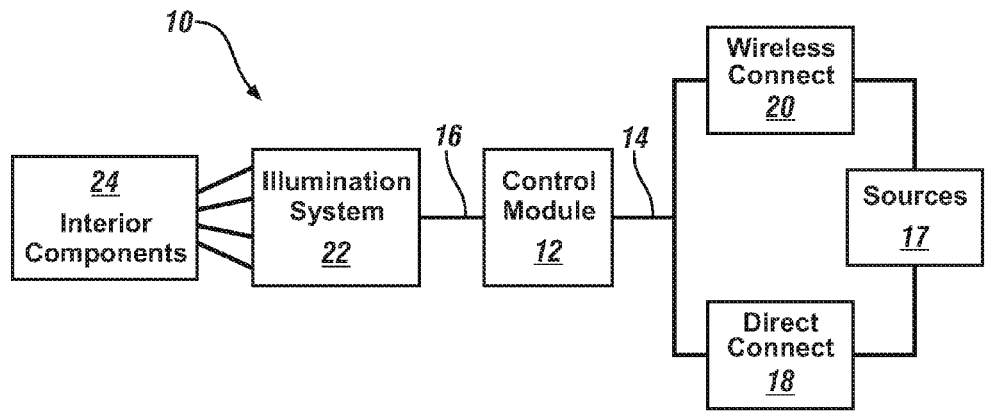
FIG. 1 is a schematic of an active ambient illumination apparatus in accordance with the present invention.

Referring now to the drawings, wherein the showings are for the purpose of illustrating certain exemplary embodiments only and not for the purpose of limiting the same, FIG. 1 schematically illustrates an active ambient interior illumination (AAII) apparatus 10. The AAII apparatus 10 includes a control module 12 having input and output portals 14, 16, respectively. The input portal 14 of the control module 12 is an informational input configured for receiving driver and passenger information collected from a plurality of sources 17, wherein the information is received via direct and/or wireless connections 18, 20, respectively, and monitored by the control module 12. The output portal 16 of the control module 12 is communicatively connected with an illumination system 22 configured to illuminate specific interior components 24 of the vehicle with a range of color and/or intensity to convey desired and meaningful user-defined information processed by the control module 12. The information is collected by the plurality of sources 17 and received by the input portal 14 of the control module 12 via the direct and/or wireless connections 18, 20, respectively.

The control module 12 is used herein to refer to any method or system for processing in response to a signal or data and should be understood to encompass microprocessors, integrated circuits, computer software, computer hardware, electrical circuits, application specific integrated circuits, personal computers, chips, and other devices capable of providing processing functions. The control module 12 is configured to receive and process informational input collected by the plurality of sources and transferred via the direct and/or wireless connections 18, 20, respectively. The information is further summarized into user-defined information and transmitted to the illumination system 22 via the output portal 16. For example, the control module 12 may receive and process trip information such as elapsed time, time to destination and average speed at pre-determined time intervals and communicate a summary of the information to the driver by communicatively changing the illumination color of the interior components 24 of the vehicle without unnecessarily distracting the driver.

Figure 2:
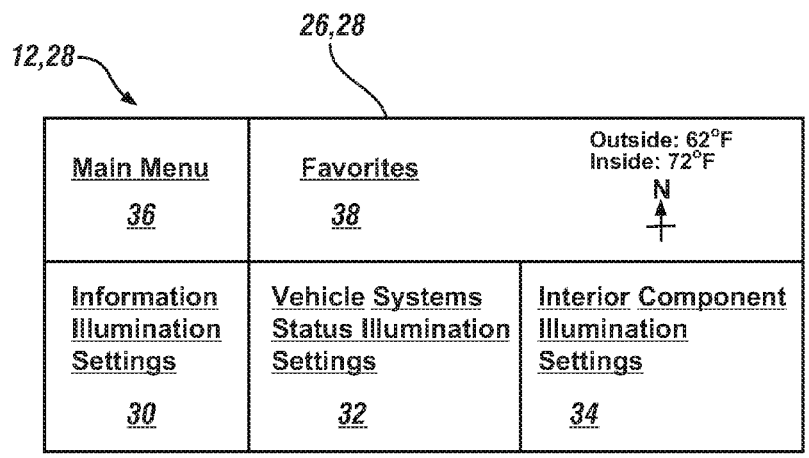
FIG. 2 is a drawing of a user interface of a control module in accordance with the present invention.

Referring to FIGS. 1 and 2, the control module 12 may further include a display 26 located in the interior of the vehicle positioned for easy access and viewing. The display 26, having a user interface (UI) 28 allows the driver to program desirable user-defined information. Specifically, the driver can define the information communicated by illumination and which interior components 24 the driver wants illuminated. The UI 28 may have organizational categories for information illumination settings 30, vehicle systems status illumination settings 32, interior component illumination settings 34, a main menu 36, and a favorites menu 38. For example, the driver may request user-defined information via the information settings 30 corresponding to categories such as, but not limited to stock prices, sports scores, traffic information, trip information, incoming calls and calendar entry reminders. In a separately organized section on the UI 28, the driver may request vehicle systems status settings 32 corresponding to categories such as, but not limited to, gas mileage, fuel level, oil level, engine/motor temperatures, tire pressure, and window washer fluid level. When user-defined informational input relating to the information settings 30 or the vehicle systems status settings 32 is processed by the control module 12, the control module 12 transmits the user-defined information to the illumination system 22. The illumination system 22 thereby communicates the user-defined information to the driver by changing the illumination color of interior components 24 within the vehicle. It should be appreciated that the UI 28 of the present invention is not limited to any specific categories or configuration thereof.

Furthermore, the interior component illumination settings 34 may also be user-defined, wherein the driver may request desired color schemes, intensity and specific interior components 24 to be illuminated. For example, all information relating to entertainment may pertain to a blue color scheme and all information relating to vehicle system status may have a red color scheme. The interior components 24 of the vehicle will be discussed later in further detail. The favorites 38 menu on the UI 28, may continuously display information such as interior temperature, outside temperature, radio station, and a compass. However, any information the driver defines may be displayed within the favorites 38 menu category. The main menu 36 category of the UI 28 allows the driver to access any information contained and stored within the control module 12. It should be appreciated, that the user can inquire about additional detailed information provided by traditional or other means when more than summary communication by changing the illumination color is desired. It should also be appreciated that the UI 28 of the present invention is not limited to any specific categories or configurations thereof.

Figure 3:
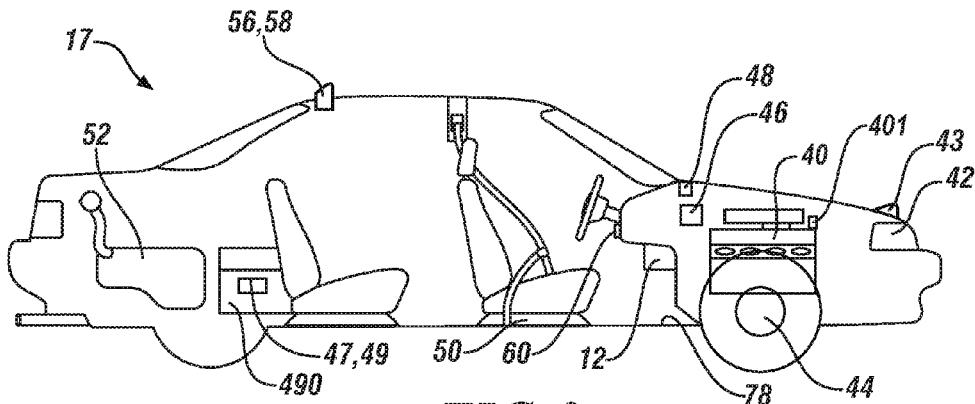
FIG. 3 is a pictorial view of a vehicle having sources directly connected to an informational input in accordance with the present invention.

Referring to FIGS. 1 and 3, the input portal 14 of the control module 12 receives informational input collected from the plurality of sources 17 and delivered via the direct or wireless connections 18, 20, respectively. The term direct connection 18 should be understood to encompass systems for delivering data, such as a network, a data bus, a wire, a circuit, a card or the like. Sources communicated via direct connection 18 generally include, but are not limited to, information input relating to vehicle systems status. The desired information input for a given source corresponds to a respective sensor that sends a signal to the control module 12 to be processed. Specifically, the sensors for the desired respective sources detect an operating state of the source and transmit the signal via direct connection 18 to the control module 12. Sources that a driver would be interested in obtaining informational input on include, but are not limited to, an engine sensor 401 of an engine 40 describing operating parameters, headlamp sensors 42, an ambient light sensor 43, wheel sensors 44, an accelerometer 46, a battery sensor 47, a motor sensor 49 of an electric machine 490, a window washer fluid level sensor 48, a seatbelt buckle engagement sensor 50, a gas tank level sensor 52, interior and exterior temperature sensors 56, 58, respectively, and an entertainment center 60 playing music. The engine 40 operating parameters measured by the engine sensor 401 further include vehicle speed, engine torque, RPMs, oil levels, and any diagnostics relating to the engine. The headlamp sensors 42 may detect intensity of the light being emitted, type of emitting source, night vision activation/deactivation, and infrared activation/deactivation. The wheel sensors 44 may include sensors for detecting distance traveled and vehicle speed by measuring the rotation of the wheel, wherein a separate sensor within the tire may detect tire pressure and road grade. In hybrid vehicles the battery and motor sensors 47, 49, respectively, are used to measure current, battery power, motor torque from an electric machine 490, battery temperature, motor temperature, and any diagnostic relating to the battery and motor. As discussed above, when information is obtained from the sensors of the direct connection 18 and pertaining to a user defined category of the information settings 30 or the vehicle systems status settings 32, the informational input is processed by the control module 12. The control module 12 transmits the user-defined information to the illumination system 22. The illumination system 22 thereby communicates the user-defined information to the driver by changing the illumination color of the interior components 24 within the vehicle without unnecessarily distracting the driver.

Figure 4:
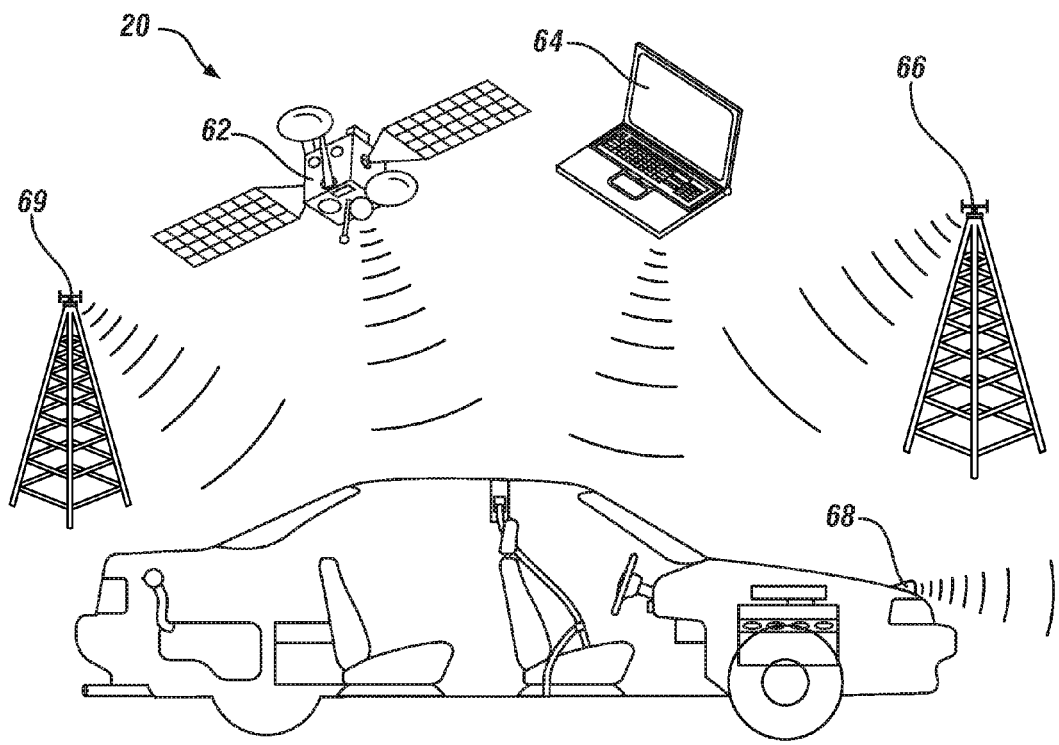
FIG. 4 is a pictorial view of the informational input of the control module configured for receiving signals via a wireless connection in accordance with the present invention.

Referring to FIGS. 1 and 4, the input portal 14 of the control module 12 receives informational input delivered via the wireless connection 20 and collected from the plurality of sources 17. Informational input delivered via the wireless connection 20 includes, but is not limited to: weather, temperature, predicted precipitation; current and predicted traffic conditions along a planned route; estimated arrival time and deviations; stock prices and sports scores; vehicle systems status; location of bystanders, obstacles or other vehicles in the vicinity of the vehicle; and status of family and home. Sources configured for transmitting information via the wireless connection 20 include, but are not limited to: a wireless communication provider 69, a GPS 62 system, wireless internet 64, cell phones via a cell phone tower 66, and a radar system 68.

In an exemplary embodiment, informational input transmitted via the wireless communication provider includes numerous possibilities. The informational input comprises information from a broadcast from the wireless communication provider, wherein the illumination color is selected based upon content of the broadcast. The broadcast may include radio signals, cell phone tower signals, and various other applications having content that may be broadcasted. The selection of the illumination color based upon content of the broadcast may be configurable by the operator of the vehicle. Alternatively, the selection of the illumination color based upon content of the broadcast is configurable by the wireless communication provider.

In an exemplary embodiment, informational input transmitted via the GPS system 62 includes numerous possibilities. A driver may set the coordinates of where the driver may want to travel. The GPS system 62 may calculate the vehicle speed, route, and average trip time. If the driver is traveling behind schedule, information may be conveyed by illuminating specific interior components 24 red. If the driver is ahead of schedule, information may be conveyed by illuminating specific interior components 24 green. Furthermore, the GPS may access a database containing information for the road the driver will be traveling along and may display information such as road grade, upcoming road speeds, number of lanes, alternate routes, construction, and elevation. The GPS system 62 may also communicate with other GPS modules to determine traffic conditions along route by measuring population of GPS units in a given area and speed at which the other vehicles are travelling. The GPS system 62 will deliver the collected information, via wireless connection 20, to the control module 12. The control module 12 will process the relevant informational input obtained and transmitted from the GPS system 62. The control module 12 transmits the user-defined information to the illumination system 22. The illumination system 22 thereby communicates the user-defined information to the driver by changing the illumination color of the interior components 24 within the vehicle without unnecessarily distracting the driver.

In another exemplary embodiment, informational input collected from the wireless internet 64 source may be monitored by the control module 12 via the wireless connection 20. The wireless internet 64 source is capable of transmitting information such as email, news, stock prices, sports scores, weather reports and traffic. For example, the wireless internet 64 may deliver informational input to the control module 12, wherein the illumination color of the interior components 24 is selected based upon content of the information from the wireless internet 64. In a more specific example, the information from the wireless internet 64 includes weather information, wherein the illumination color of the interior components 24 is selected based upon a forecast adverse to driving conditions contained in the weather information. In yet another example, the information from the wireless internet 64 includes traffic information, wherein the illumination color of the interior components 24 is selected based upon identification of abnormal traffic patterns along a selected travel route. Furthermore, information provided by the wireless internet 64 source, and delivered via the wireless connection 20 to the control module 12, may be altered by the driver to process only the information the user defines. For example, at one moment the user may want to know current weather conditions, but later may want to receive information relating to stock prices or sports scores. Once the information provided by the wireless internet 64 source is processed by the control module 12, the control module 12 transmits the operator selectable content to the illumination system 22. The illumination system 22 thereby communicates the operator selectable content to the driver by changing the illumination color of the interior components 24 within the vehicle. For example, the operator selectable content may comprise sport scores, wherein the illumination color includes descriptive illumination based upon the sport scores. In yet another example, the operator selectable content may comprise financial market information, wherein the illumination color includes descriptive illumination based upon the financial market information reaching an operator defined threshold.

In yet another exemplary embodiment, informational input collected from the driver's cell phone via the cell phone tower 66 source is monitored by the control module 12 via the wireless connection 20. The cell phone 66 source includes PDAs and smart phones. The cell phone via the cell phone tower 66 may act as a source of wireless internet, and function in the same way as the wireless internet 64 source discussed above. In accordance with an exemplary embodiment, the cell phone via the cell phone 66 source may subtly identify and discern between incoming information such as phone calls, email, and text messages. Incoming information provided by the cell phone via the cell phone tower 66 is delivered via the wireless connection 20 to the control module 12, where the informational input is processed according to user-defined criteria. The control module 12 transmits the user-defined information to the illumination system 22. The illumination system 22 thereby communicates the user-defined information to the driver by changing the illumination color of the interior components 24 within the vehicle without unnecessarily distracting the driver.

In yet another embodiment, informational input provided by the radar source 68 may be monitored by the control module 12 via the wireless connection 20. The radar source 68 is used to collect information relating to the exterior environment of the vehicle. For example, when the vehicle is backing up on a driveway or in a parking lot, the radar source 68 may detect bystanders in way of the vehicle or objects behind the vehicle. Additionally, the radar source 68 may be used in conditions where visibility is extremely poor to detect obstacles in the road or other vehicles while driving. If the vehicle is travelling along the highway, other vehicles in the blind spot of the driver's vehicle may be detected by the radar source 68, wherein the information is delivered via wireless connection 20 to the control module 12. In another example, the radar source 68 may detect the distance to another vehicle in front of the vehicle, wherein the analysis of the information from the radar source 68 comprises comparing the distance to the other vehicle to a minimum distance. The information is processed by the control module 12. The control module 12 transmits the user-defined information to the illumination system 22. The illumination system 22 thereby communicates the user-defined information to the driver by changing the illumination color of the interior components 24 within the vehicle.

Referring back to FIG. 1, the illumination system 22 comprises a network of individual lights that are controlled by the control module 12. The control module 12 transmits a stream of data, representing the summary information defined by the driver, to the series of individual lights. The illumination system 22 may be equipped with a transmitter, receiver, or both to facilitate communication, and the control module 12 may be programmed to control the communication capabilities in a conventional manner. In an exemplary embodiment, the network of lights comprises a series of light emitting diodes (LEDs). LEDs are known which, when disposed on a circuit, accept electrical impulses from the circuit and convert the impulses into light signals. LEDs are energy efficient, they give off virtually no heat, and they have a long lifetime.

A number of types of LED exist, including air gap LEDs, GaAs light-emitting diodes, polymer LEDs, and semi-conductor LEDs, among others. Most LEDs in current use are red, yellow or white. Conventional uses for LEDs include displays for low light environments, such as the flashing light on a modem or other computer component, or the digital display of a wristwatch. Improved LEDs have recently been used in arrays for longer-lasting traffic lights. LEDs have been used in scoreboards and other displays. Also, LEDs have been placed in arrays and used as television displays. Although most LEDs in use are red, yellow or white, LEDs may take any color. Moreover, a single LED may be designed to change colors to any color in the color spectrum in response to changing electrical signals.

It is well known that combining the projected light of one color with the projected light of another color will result in the creation of a third color. It is also well known that three commonly used primary colors—red, blue and green—can be combined in different proportions to generate almost any color in the visible spectrum. The exemplary embodiment takes advantage of these effects by combining the projected light from at least two LEDs of different primary colors. It should be understood that for purposes of this invention the term "primary colors" encompasses any different colors that can be combined to create other colors.

In alternative embodiments, the illumination system 22 includes all illumination sources as well as incandescent sources, including filament lamps, pyro-luminescent sources, such as flames, candle-luminescent sources, such as gas mantles and carbon arch radiation sources, as well as photo-luminescent sources, including gaseous discharges, fluorescent sources, phosphorescence sources, lasers, electro-luminescent sources, such as electro-luminescent lamps and cathode luminescent sources using electronic satiation, as well as miscellaneous luminescent sources including galvano-luminescent sources, crystallo-luminescent sources, kine-luminescent sources, thermo-luminescent sources, triboluminescent sources, sonoluminescent sources and radioluminescent sources. Illumination sources may also include luminescent polymers capable of producing primary colors.

Figure 5:
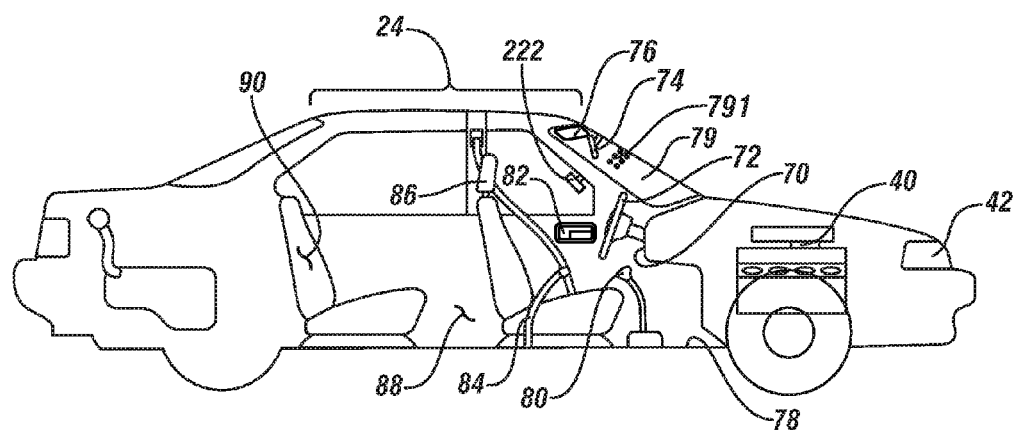
FIG. 5 is a pictorial view of interior components of the illumination system in accordance with the present invention.

Referring to FIGS. 1 and 5, the AAII apparatus 10 comprises the illumination system 22. The output portal 16 of the control module 12 transmits user-defined informational input to the illumination system 22. The illumination system 22 thereby communicates the user-defined information to the driver by changing the illumination color of the interior components 24 within the vehicle. In an exemplary embodiment, the illumination system 22 is configured to illuminate specific interior components 24 of the vehicle interior with a range of color and/or intensity to convey desired and meaningful information collected by the plurality of sources 17. It should be appreciated that the illumination system 22 is configured so that it may be embedded, inserted or implanted within the surface of the interior components 24 or unenclosed and unbounded on the surface of the interior components 24.

Figure 6A:
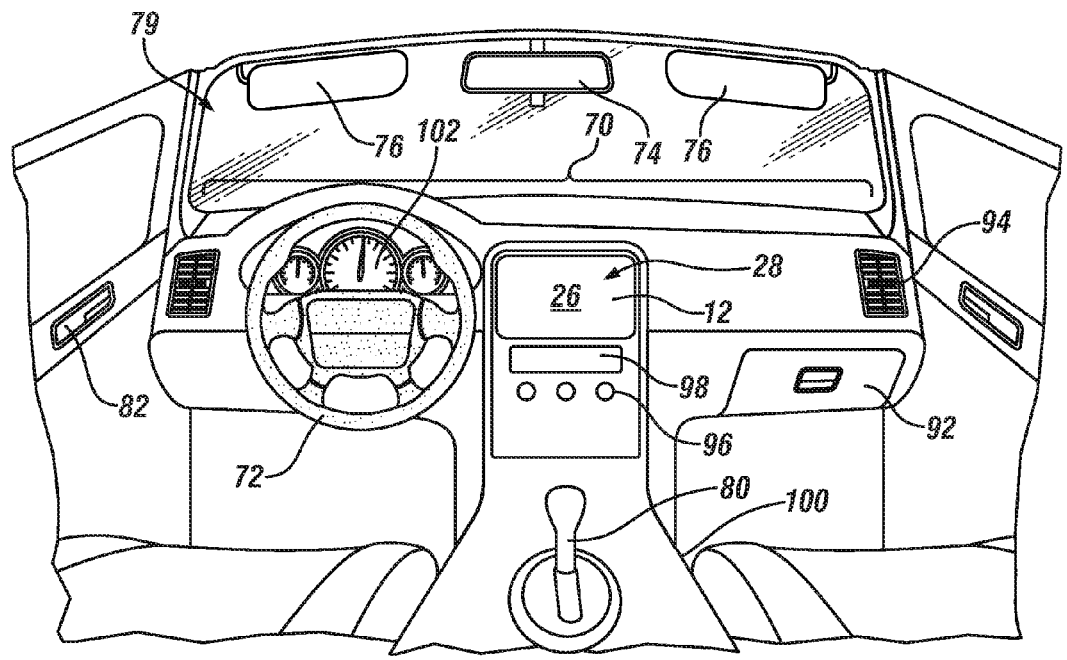
FIG. 6A is a pictorial view of the instrumentation panel of the illumination system in accordance with the present invention.

Referring to FIGS. 5 and 6A, exemplary interior components 24 include any component capable of communicating user-defined key criteria based upon the status of the vehicle, personal, or environmental conditions to the driver by communicatively changing the illumination color of the components. Communicatively changing the illumination color of the interior components 24 is achieved in a manner that provides subtle, non-intrusive, high-level summary status of the user-defined key criteria. Interior components 24 of the vehicle include, but are not limited to an instrument panel 70, a steering wheel 72, the periphery of a rear view mirror 74, sun visors 76, floor mats 78, a gear selector 80, door handles 82, a seat belt system 84, head rests 86, a substantially transparent windscreen 79 and door and seat trim 88, 90, respectively. The substantially transparent windscreen 79 comprises light emitting structures 791 therewithin, wherein the illumination system 22 comprises an emitter 222 configured to excite the light emitting structures according to the illumination color.

Referring to FIG. 6A, a detailed view of the instrument panel 70 of the illumination system 22 is shown. Features of the instrument panel 70 desirable for illumination include, but are not limited to, a glove box 92, climate system vents 94, a climate system control 96, an entertainment unit 98, a center console 100 and gauges 102. These features, independent of one another, are all capable of communicatively changing the illumination color based on information processed and transmitted by the control module 12. For example, the radar source 68 shown in FIG. 4 may detect another vehicle located at or near the right blind spot of the vehicle. Features on the right side of the instrument panel 70 may change to a distinct color, thereby warning the driver of the vehicle in the blind spot on the right side. Similarly, the interior components 24 may change illumination color to communicate the location of bystanders in the area of the vehicle when the driver is backing out of a driveway or in a parking lot.

In another exemplary embodiment, the driver or passenger could program the control module 12 to notify the driver or passenger when a certain radio program or sporting event will be broadcasted over the radio. At such a time, the trim of the entertainment unit 98 may communicatively change illumination color to subtly notify the driver that the radio program or sporting event is about to air. Additionally, the wireless internet 64 source may transmit user-defined information to the control module 12 such as news or stock prices, wherein certain interior components 24 such as sun visors 76, the steering wheel 72 or the rear view mirror 74 may change illumination color according to information collected by the wireless internet 64 source.

In yet another exemplary example, features of the instrument panel 70 or other interior components 24 may change to specific illumination colors representing the ambient exterior climate or the interior climate. If temperatures drop below a certain level outside, interior components 24 may communicatively change illumination colors. If climate conditions are changing at a future location along route, the interior components 24 may communicatively change illumination colors to notify the driver of an approaching storm. Additionally, the climate system vents 92 of the instrument panel 70 may turn blue when the air conditioning is on or red when the heat is turned on.

In yet another exemplary example, interior components 24 may change illumination color or pulsate between colors when an incoming phone call, text message, or email is received by the control module 12 via the wireless connection 20. For example, the driver may program the control module 12 to distinguish between important or unimportant calls, texts or emails, or determine an identifier of the person originating an incoming call and compare the identifier to an operator defined communication color scheme, wherein the illumination color is selected based upon the comparing. The changing of illumination colors of the interior components 24 subtly and non-intrusively notifies the driver of the information relating to incoming calls, texts or emails. Subsequently, if the driver desires, the driver may inquire into additional more detailed information provided by traditional or other means.

In yet another exemplary example, the GPS system may deliver informational input to the control module 12 via the wireless connection 20. The control module 12 of the AAII apparatus 10 will process the relevant information collected and received from the GPS system 62. The control module 12 transmits the relevant information to the illumination system 22. The illumination system 22 thereby communicates the user-defined information to the driver by changing the illumination color of the interior components 24 within the vehicle. For example, if the driver misses a turn in route or is approaching a destination, the interior components 24 of the illumination system 22 may change illumination color to notify the driver. The driver, at an appropriate time, may then consult a map on the GPS system.

Figure 6B:
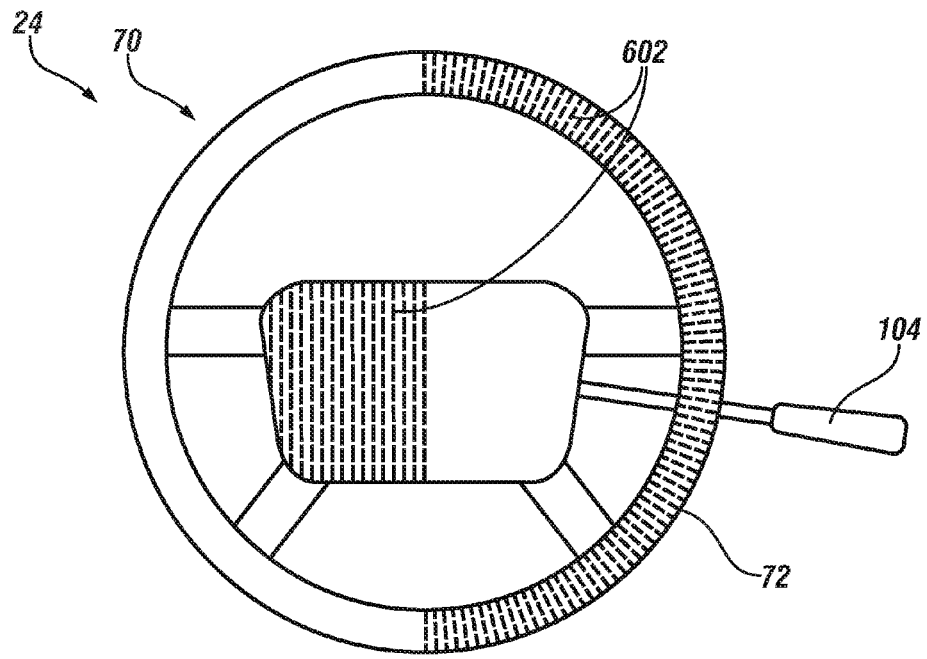
FIG. 6B is a pictorial view of the steering wheel of the illumination system in accordance with the present invention.

In an exemplary embodiment, and referring to FIG. 6B, a detailed pictorial view of the steering wheel 72 of the illumination system 22 is shown. It is appreciated that any details, functions or features of the steering wheel 72 may be incorporated to any interior component 24 of the vehicle. The dashed lines represent sections of the steering wheel 72 illuminated by the illumination system including the network of individual lights 602 that are controlled by the control module 12. As aforementioned, the network of lights 602 can include a series of LEDs. The steering wheel 72 may have an illumination color scheme to describe the vehicle's current status in arriving at destination on time. For example, a red hue if the vehicle is traveling behind pace. A green hue if the vehicle is traveling ahead of pace. Additionally, communicatively changing the illumination color on the right or left side of the steering wheel 72 could alert the driver of an oncoming right or left turn in the road. The vehicle's travelling status, as discussed above, may be communicated via the wireless connection from the GPS source or direct connection provided by sensors located on the engine and or wheels. Optionally, the steering wheel 72 may change illumination color on specific sections such as the entire right or left sides, the top or bottom, the outer periphery, or the inner periphery. If the user defines a specific content via the wireless internet, such as a sports score, the steering wheel 72 may flash or pulsate illuminated color to notify the driver. Furthermore, changing the illumination color on the right or left side of the steering wheel 72 could alert the driver of cars approaching the left or right side of the vehicle, where such information is provided via the radar source.

An exemplary embodiment may include communicatively changing the illuminating color of the interior components 24 to recommend optimum settings that relate to the vehicle system status. Information is provided by the plurality of sources, and delivered to the control module via the direct and/or wireless connections. For example, the ambient light sensor 43 (shown in FIG. 3) could detect that it is turning dark outside, wherein the headlamp controls 104 would communicatively change illumination color. Additionally, when operating the headlamps in bright mode, the GPS or radar sources of the wireless connection could detect oncoming traffic, wherein headlamp controls 104 would communicatively change illumination color to notify the driver that bright mode should be turned off. Furthermore, a source of the direct connection could detect when there is frost on the windows, wherein the climate controls 96 would communicatively change illumination color to notify the driver that the defrost control is recommended. Another exemplary example relating to recommended optimum settings consists of the door trim 88 changing illumination color when a sensor detects that the door is not fully shut. For example, the door could illuminate red when the door is not shut properly. Also, when the door is completely open, it could be illuminated to provide lighting for getting into and out of the car.

Another exemplary embodiment of communicatively changing the illumination color of the interior components 24 to recommend optimum settings includes conditions where the vehicle is operating in hazardous conditions. In such conditions it may be detected that road grade may be slippery due to moisture or ice. Furthermore, the GPS source could provide information that a steep pass is approaching and could thereby further increase the likelihood of slippery road conditions. The control module 12 would process the information received from the sources. The control module 12 may then transmit user-defined information to the illumination system 22, wherein a traction control component would communicatively change illumination color to notify the driver that traction control or four-wheel drive is recommended.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Apparatus for communicating information to an operator of a vehicle without unnecessarily distracting the operator by illuminating an interior of the vehicle with different colors, comprising:
    an illumination control module monitoring an informational input, and determining a lighting color command based upon the informational input;
    an illumination system communicating with the illumination control module and generating an illumination color within the interior based upon the lighting color command; and
    a user interface allowing the operator to select an interior component within the interior that the operator desires to be illuminated by the illumination system.

2. The apparatus of claim 1, wherein the illumination control module includes a connection to the Internet; wherein the informational input comprises information from the Internet; and wherein the illumination color is selected based upon content of the information from the internet.

3. The apparatus of claim 2, wherein the information from the Internet includes weather information; and wherein the illumination color is selected based upon a forecast in the weather information adverse to driving conditions.

4. The apparatus of claim 2, wherein the information from the Internet includes traffic information; and wherein the illumination color is selected based upon identification of abnormal traffic patterns along a selected travel route.

5. The apparatus of claim 2, wherein the information from the Internet includes "operator selectable" content; and wherein the illumination color is selected based upon the "operator selectable" content.

6. The apparatus of claim 5, wherein the "operator selectable" content comprises sport scores.

7. The apparatus of claim 5, wherein the "operator selectable" content comprises financial market information.

8. The apparatus of claim 1, wherein the illumination control module includes a connection to a wireless communication provider; wherein the informational input comprises information from a broadcast from the wireless communication provider; and wherein the illumination color is selected based upon content of the broadcast.

9. The apparatus of claim 8, wherein the selection of the illumination color based upon content of the broadcast is configurable by the operator of the vehicle.

10. The apparatus of claim 8, wherein the selection of the illumination color based upon content of the broadcast is configurable by the wireless communication provider.

11. The apparatus of claim 1, further comprising a sensor monitoring conditions external to the vehicle; wherein the informational input comprises information from the sensor; and wherein the illumination color is selected based upon analysis of the information from the sensor.

12. The apparatus of claim 11, wherein the conditions external to the vehicle comprise presence of an object behind the vehicle.

13. The apparatus of claim 11, wherein the conditions external to the vehicle comprise presence of another vehicle in a lane of travel next to the vehicle.

14. The apparatus of claim 11, wherein the conditions external to the vehicle comprise a presence presences of another vehicle in front of the vehicle; and
    wherein the analysis of the information from the sensor comprises comparing a distance to the other vehicle to a minimum distance.

15. The apparatus of claim 1, wherein the informational input comprises incoming communication to the operator.

16. The apparatus of claim 15, wherein the incoming communication is selected from the group consisting of a phone call, a phone text message, an email, or an Internet communication;
    wherein the illumination control module further determines an identifier of a person originating the incoming communication; and
    wherein the illumination color is selected based upon the identifier of the person originating the incoming communication.

17. The apparatus of claim 1, further comprising a global positioning system accessing a database; wherein the informational input comprises information from the global positioning system; and wherein the illumination color is selected based upon the information from the global positioning system.

18. The apparatus of claim 1, wherein the illumination system comprises a network of lights comprising LEDs.

19. The apparatus of claim 18, wherein the network of lights comprising LEDs are embedded within the interior component selected from the group consisting of: an instrument panel, a steering wheel, a periphery of a rear view mirror, a sun visor, a floor mat, a gear selector, a door handle, a seat belt system, a head rest, a door trim and a seat trim.

20. The apparatus of claim 19, wherein the steering wheel comprises sections of the steering wheel having an illumination color scheme independent from other sections of the steering wheel.

21. The apparatus of claim 1, wherein the user interface allows the operator to define an informational source of the informational input being monitored.

22. The apparatus of claim 1, wherein the informational input originates from an informational source describing a vehicle system operational status; and wherein the illumination control module further wirelessly monitors the informational input.

23. The apparatus of claim 22, wherein the informational source is selected from the group consisting of an engine sensor monitoring an operating parameter of an engine, a headlamp, an ambient light sensor, a vehicle wheel, an accelerometer, a battery, a motor sensor measuring motor torque provided by an electric machine, a window washer fluid level sensor, a seat belt device, a gas tank level sensor, an interior temperature sensor, an ambient temperature sensor, and an entertainment system.

24. The apparatus of claim 1, further comprising a substantially transparent windscreen comprising light emitting structures therewithin; and wherein the illumination system comprises an emitter configured to excite the light emitting structures according to the illumination color.

* * * * *